United States Patent

Parker

[15] 3,649,989
[45] Mar. 21, 1972

[54] TRANSVERSE WIPER APPARATUS

[72] Inventor: Eric G. Parker, Kettering, Ohio

[73] Assignee: General Motors Corporation, Detroit, Mich.

[22] Filed: Aug. 27, 1970

[21] Appl. No.: 67,514

[52] U.S. Cl. ....................................15/250.16, 15/250.29
[51] Int. Cl. ..................................B60s 1/32, B60s 1/44
[58] Field of Search .........15/250.1, 250.16, 250.17, 250.19, 15/250.24, 250.25, 250.26, 250.27, 250.29, 250.21

[56] References Cited

UNITED STATES PATENTS

| | | | |
|---|---|---|---|
| 1,661,388 | 3/1928 | Sather | 15/250.29 X |
| 3,078,494 | 2/1963 | Price | 15/250.26 X |
| 3,505,702 | 4/1970 | Omlie et al | 15/250.29 X |

*Primary Examiner*—Peter Feldman
*Attorney*—W. E. Finken and W. A. Schuetz

[57] ABSTRACT

In a preferred form, this disclosure relates to a windshield wiping apparatus which includes a windshield wiper and an actuating mechanism operatively connected with the wiper for reciprocating the latter transversely of the windshield while maintaining the wiper in a generally vertical disposition between first and second positions during running operation and for moving the wiper between a parked position adjacent the lower edge of the windshield and its generally vertical run position when operation is initiated and terminated. The actuating mechanism includes a generally horizontally extending guide track, a trolley operatively connected with the wiper and which is supported and guided for reciprocable movement through a first path by the guide track during running operation, and a parking means including an auxiliary guide track pivotally supported by the main guide track. The auxiliary guide track is selectively movable into the path of movement of the trolley and serves to guide the trolley for movement through a second path transversely of the first path to cause the wiper operatively connected therewith to be moved from its generally vertical run position toward its park position when operation is being terminated.

6 Claims, 8 Drawing Figures

INVENTOR.
Eric G. Parker
BY
W. A. Schuetz
ATTORNEY

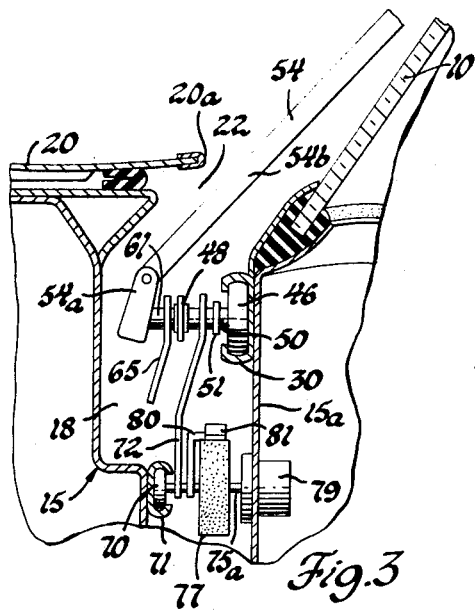
Fig.3
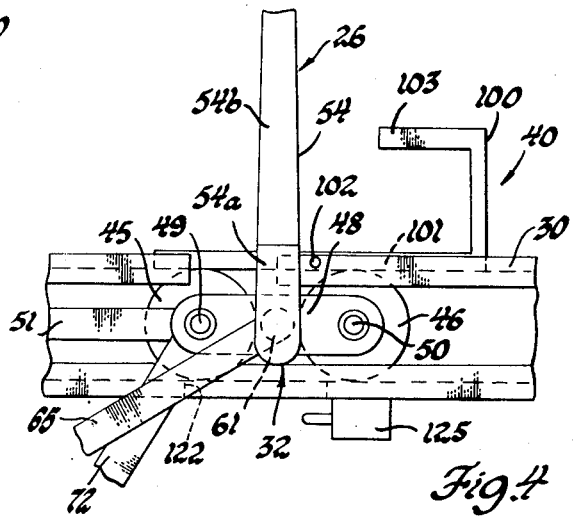
Fig.4
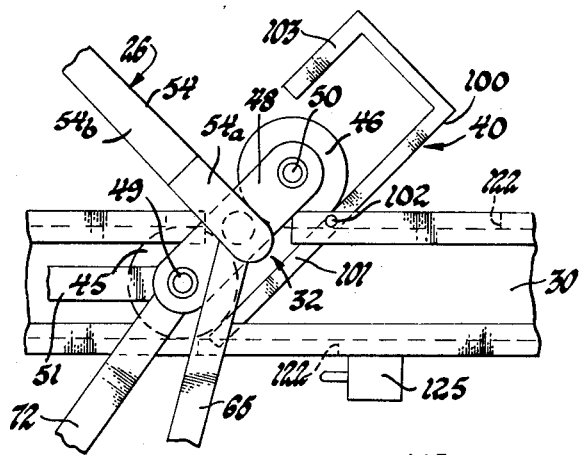
Fig.6
Fig.5
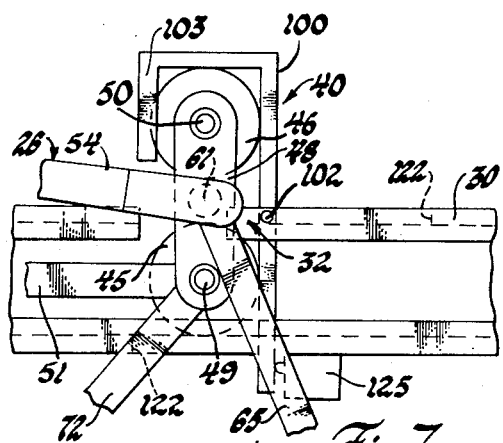
Fig.7
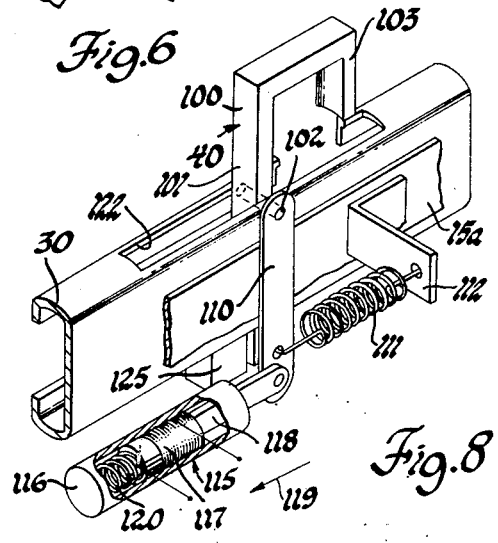
Fig.8
INVENTOR
Eric G. Parker
BY
W. A. Schuetz
ATTORNEY

TRANSVERSE WIPER APPARATUS

The present invention relates to a window wiping apparatus for wiping a window of an automotive vehicle, and in particular to a windshield wiping apparatus having a pair of windshield wipers which are moved transversely of the windshield during running operation while being maintained in a generally vertical disposition and which are movable between their generally vertical run position and a parked position adjacent the lower edge of the windshield when operation is being terminated and initiated.

Heretofore, transverse wiper systems for moving a pair of windshield wipers transversely of the windshield while maintaining them in a vertical disposition have been provided. An advantage of such a wiper system is that substantially all of the windshield can be wiped. Such wiper systems have also been provided with parking mechanisms for moving the wipers from a generally vertical run position to a generally horizontal park position when wiper operation is terminated. For example, U.S. Pat. No. 2,785,430 shows a separate motor and drive arrangement for pivoting the wipers between their generally vertical run position and a generally horizontal park position when wiper operation is terminated. U.S. Pat. Nos. 3,505,702 and 3,078,494 show transverse wiper systems in which parking mechanisms are provided for rotating the wipers from their generally vertical run position to their park position.

The present invention provides a novel transverse windhsield wiping apparatus for moving a pair of windshield wipers transversely across the outer surface of the windshield between first and second positions during running operation while maintaining the wipers in a generally vertical disposition and for moving the windshield wipers from their generally vertical run position toward a parked position adjacent an edge of the windshield when wiper operation is being terminated. The wiper apparatus, in the preferred embodiment, comprises a pair of interconnected trolleys for supporting the wipers and which in turn are supported for reciprocable movement in opposite directions during running operation by a main guide track. The wiper apparatus also includes a parking means for moving the wipers between their generally vertical run position to a parked position, and vice versa, when operation is terminated and initiated, respectively. The parking means includes an auxiliary guide track which is movable between a first position in which it does not interfere with the path of movement of one of the trolleys and a second position in which it is disposed within the path of movement of one of the trolleys to cause the latter to be moved through a second path transversely of the first path and thereby cause the wipers to be moved towards their park position.

Accordingly, an important object of the present invention is to provide a new and improved windshield wiping apparatus comprising a windshield wiper and an actuating mechanism operatively connected with the wiper for reciprocating the latter transversely of the windshield while maintaining the wiper in a generally vertical disposition between first and second positions during running operation and for moving the wiper between a park position adjacent an edge of the windshield and its generally vertical run position when operation is initiated and terminated, and wherein the actuating mechanism comprises a trolley operatively connected with the wiper and which is supported and guided for reciprocable movement through a first path by a main guide means during running operation of the wiper and a parking means including an auxiliary guide means for guiding the movement of the trolley through a second path when running operation is being terminated or initiated to cause the wipers to be moved between their parked position and their generally vertical run position.

Another object of the present invention is to provide a new and improved windshield wiping apparatus, as defined in the preceding object, and wherein the auxiliary guide means is pivotally supported by the main guide means and selectively movable into the path of movement of the trolley to cause the latter to be moved through a second path transversely of the first path and thereby cause the wiper connected thereto to be moved from its generally vertical run position toward its park position.

A further object of the present invention is to provide a new and improved windshield wiping apparatus, as defined in the preceding objects, and wherein the auxiliary guide means is movable between a first position in which it forms part of the main guide means to guide the trolley through its first path of movement and a second position in which it is disposed within the path of movement of the trolley to cause the trolley to be guided into its second path of movement.

The present invention further resides in various novel constructions and arrangements of parts, and further objects, novel characteristics and advantages of the present invention will be apparent to those skilled in the art to which it relates and from the following detailed description of the illustrated embodiments thereof made with reference to the accompanying drawings forming a part of this specification and in which similar reference numerals or characters are employed to designate corresponding parts throughout the several views, and in which:

FIG. 3 is an enlarged sectional view taken approximately along line 3—3 of FIG. 2;

FIG. 4 is an enlarged fragmentary view of part of the windshield wiping apparatus shown in FIG. 2;

FIG. 5 is an enlarged cross sectional view taken approximately along line 5—5 of FIG. 2;

FIGS. 6 and 7 are enlarged fragmentary views showing part of the windshield wiping apparatus and with different parts thereof in different positions; and FIG. 8 is a diagrammatic view of part of the windshield wiping apparatus.

Figure 1:
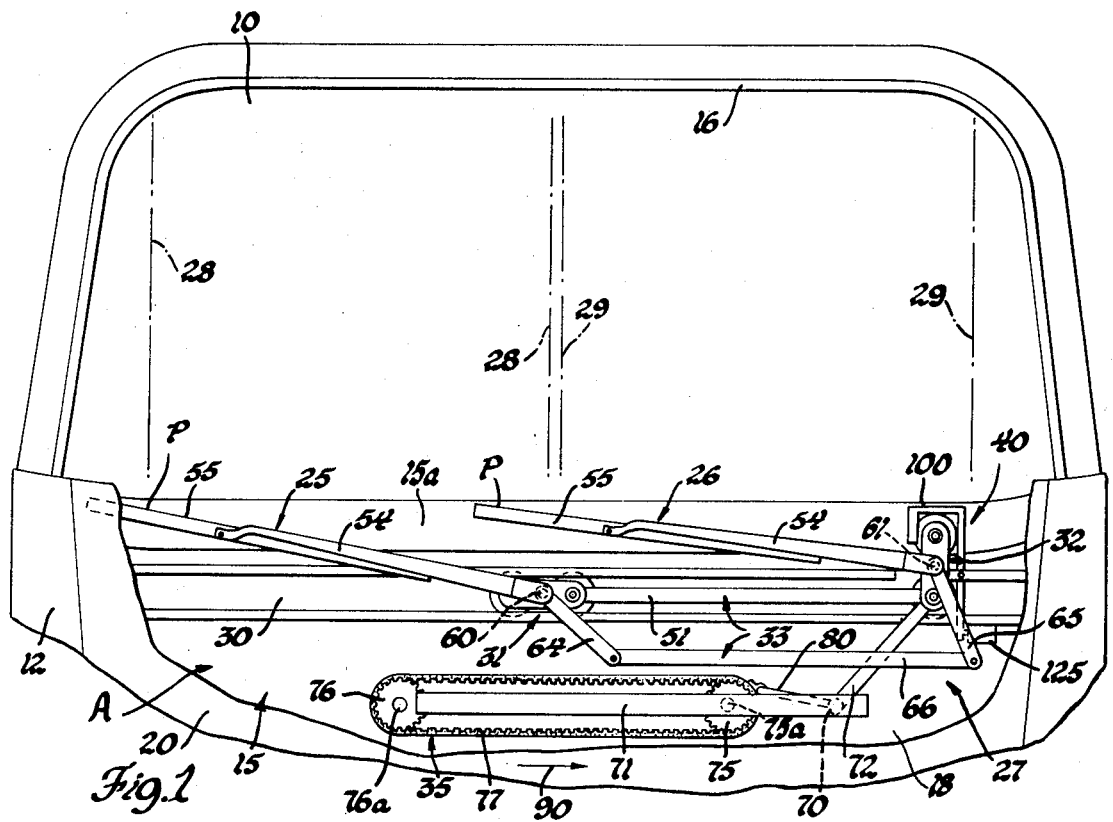
FIG. 1 is a fragmentary front elevational view of a vehicle embodying the novel windshield wiping apparatus of the present invention.

The present invention provides a novel window wiping apparatus for wiping a window of an automotive vehicle. Although the window wiping apparatus of the present invention could be used for wiping various vehicle windows, it is particularly useful for wiping the windshield of an automotive vehicle and thus, will herein be described and shown as being used for the latter purpose.

As representing a preferred embodiment of the present invention, the drawings show a windshield wiping apparatus A for wiping a windshield 10 of an automotive vehicle 12. The windshield 10 is supported by suitable body structure 15 of the vehicle 12 and its outer periphery is surrounded by a reveal molding 16. The body structure 15 defines a well or chamber 18 adjacent the windshield at its lower edge and in which the windshield wiping apparatus A is housed. The vehicle 12 also includes a forwardly extending hood 20 whose rearward edge 20a is spaced forwardly of the windshield to define a slot 22 extending transversely of the vehicle 12 and which is in communication with the well 18.

The windshield wiping apparatus A comprises, in general, a pair of windshield wipers 25 and 26 and an actuating mechanism 27 operatively connected with the windshield wipers for reciprocating the latter transversely of the windshield 10 while the wipers remain in a generally vertical disposition between first and second positions 28 and 29 during running operation and for moving the wipers from their generally vertical run position to a generally horizontal park position P, and vice versa, when operation is being terminated and initiated. The actuating mechanism 27 broadly comprises a main guide means or track 30, a pair of trolleys 31 and 32 for supporting the wipers 25 and 26, respectively, a parallel linkage arrangement 33 interconnecting the wipers 25 and 26, a drive means 35 operatively connected with the trolley 32 for reciprocating the latter through a first path of movement to cause the wipers to be moved between their first and second positions during running operation, and a parking means 40 which is operable to guide the movement of the trolley 32 through a second path of movement when running operation is being terminated to cause the wipers 25 and 26 to be moved toward their park position P.

Figure 2:
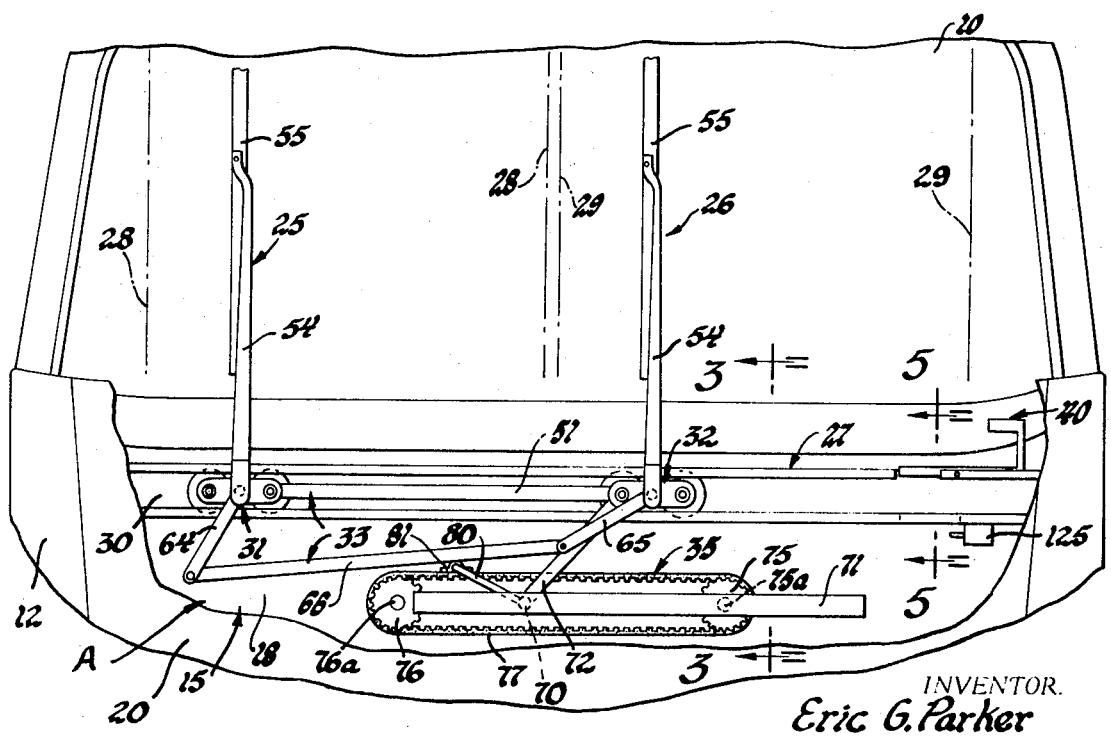
FIG. 2 is a view like FIG. 1, but showing different parts of the windshield wiping apparatus in different positions.

As best shown in FIGS. 1 and 2, the guide track 30 is suitably secured to a support panel 15a of the body structure 15 of the vehicle. The guide track 30 extends horizontally across the vehicle 12 adjacent the lower edge of the windshield 10 and comprises an elongated channel which is reverse C-shaped, as viewed in cross section in FIGS. 3 and 5.

The trolleys 31 and 32 are supported and guided for reciprocable movement in opposite directions by the guide track 30. The trolleys 31 and 32 each comprise a pair of spaced rollers 45 and 46 and a link or support member 48 having its opposite ends pivotally connected to shafts 49 and 50 rotatably carried by the rollers 45 and 46. The trolleys 31 and 32 are interconnected by a link 51 having one end swivelly connected to the pivot shaft 50 of the roller 46 of the trolley 31 and its other end swivelly connected to the pivot shaft 49 carried by the roller 45 of the trolley 32.

The wipers 25 and 26 are carried by the links 48 of the trolleys 31 and 32, respectively. The wipers 25 and 26 can be of any suitable or conventional construction and are hereshown as comprising a wiper arm 54 for carrying a wiper blade assembly 55. The wiper arm 54 has spring hinge connected inner and outer sections 54a and 54b and with the outer arm section 54b biasing the wiper blade assembly 55 into engagement with the outer surface of the windshield 10. The wiper arm 54 of the wiper 25 is suitably fixed to a stub shaft 60, which in turn is pivotally supported by the link 48 of the trolley 31 for movement about the axis of the shaft 60. The wiper arm 54 of the wiper 26 is suitably fixed to a stub shaft 61 nonrotatably secured or supported by the link 48 of the trolley 32.

The wipers 25 and 26 are interconnected via the parallel linkage arrangement 33. The parallel linkage arrangement 33 comprises in addition to the link 51 previously described, a pair of arms or links 64 and 65 and a cross link 66 extending parallel to the link 51. The link 64 at its upper end is pivotally secured to the stub shaft 60 and the link 65 is nonrotatably secured at its upper end to the stub shaft 61. The link 66 at its opposite ends is swivelly connected to the lower end of the links 64 and 65.

The trolleys 31 and 32 are adapted to be reciprocated through a first path to move the wipers 25 and 26 between their first and second positions 28 and 29 during running operation by the drive means 35. The drive means 35 comprises a continuous belt drive for reciprocating a roller 70 guided by a guide channel 71 and a drive link 72 having one end pivotally connected to the roller 71 and its other end swivelly connected to the stub shaft 49 carried by the roller 45 of the trolley 32. The continuous belt drive comprises a drive pulley or sprocket 75, an idler pulley or sprocket 76 and an endless belt 77. The pulleys 75 and 76 are fixed to shafts 75a and 76a rotatably journaled in housings secured to the panel 15a of the vehicle support structure 15 and the endless belt 77 is trained around the pulleys 75 and 76. The shaft 75a of the drive pulley 75 is operatively connected with an electric motor and gear reduction unit 79. The continuous belt 77 is drivingly connected with the roller 71 by a link 80. The link 80 has one end pivotally connected to a bracket 81 secured to the endless belt and its other end pivotally connected to the roller 70.

In operation, the endless belt 77 is continuously moved in the direction of the arrow 90 when the drive pulley 75 is rotated in response to energization of the wiper motor 79. Movement of the belt 77 in the direction of the arrow 90 causes the roller 70 to be reciprocated back and forth within the guide channel 71. The reciprocable movement of the roller 70 in turn causes the drive link 72 to reciprocate the trolley 32. Reciprocation of the trolley 32 within the guide track 30 also causes the trolley 31 to be reciprocated back and forth due to the parallel linkage arrangement 33.

During running operation, when the wipers 25 and 26 are linearly moved transversely of the windshield 10, the wiper 26 is maintained in its generally vertical disposition as a result of its nonrotatable connection with the trolley 32. The wiper 25 is maintained in its generally vertical disposition during running operation by virtue of the parallel linkage arrangement 33, since the link 65 thereof cannot rotate relative to the trolley 32.

As alluded to hereinbefore, the wipers 25 and 26 are adapted to be moved from their generally vertical run position to their park position P when wiper operation is being terminated. To this end, the parking means 40 is provided. The parking means 40 comprises an auxiliary guide track or latching means 100 located adjacent the rightmost end of the guide track 30, but between the ends of travel of the trolley 32. The auxiliary guide track 100 comprises a generally U-shaped member having its longer leg 101 being pivotally connected by a pivot pin means 102 to the main guide channel 30 at the upper end of the latter. The shorter leg 103 of the guide track 100, as viewed in cross section, is shaped the same as the upper end of the main guide track 30.

The auxiliary guide track 100 is movable between first, second and third positions. When in its first position, as shown in FIG. 2, it is disposed generally parallel to the main guide track 30 and the leg 101 thereof forms part of the guide track 30 to aid in guiding the trolley 32 through its first path of movement in the guide track 30. The auxiliary guide track 100 when in its second position, as shown in FIG. 6, is inclined with respect to the main guide track 30 and the leg 101 thereof is disposed within the path of movement of the trolley 32 as it is reciprocated in the main guide track. The auxiliary guide track 100 when in its third position as shown in FIG. 7, extends normal to the main guide track 30.

The auxiliary guide track 100 is normally spring biased towards its first position. To this end, the pivot pin means 102 extends through an opening in the panel 15a and is fixedly secured to one end of a link 110. The other end of the link 110 is pivotally connected to one end of a tension spring 111, the other end of the tension spring 111 being suitably connected to a stationary member 112 on the vehicle body.

The auxiliary guide track 100 is movable from its first position, as shown in FIG. 2, towards its second position, as shown in FIG. 6, in response to energization of a solenoid 115. The solenoid includes a housing 116, a coil 117 and a movable core 118, the core having one end pivotally connected to the link 110. When the coil 117 is energized it moves the core in the direction of the arrow 119 to cause the link to be pivoted in a counterclockwise direction, as viewed in FIG. 8, to cause the auxiliary guide track 110 to be moved from its first position towards its second position. The solenoid 115 also includes a compression spring 120 having one end in engagement with the housing 116 and the other end adjacent the core 118, and for reasons to be hereinafter more fully described. It should be noted that the leg 101 of the auxiliary guide track is narrower than the width of the main guide track 30, as shown in FIG. 8, and that the main guide track adjacent the bottom portion thereof has an elongated slot 122 therein to enable the leg 101 to be moved therethrough as the auxiliary guide track is moved toward its third position, as shown in FIG. 7. The width of the slot 122 is less than the width of the rollers 45 and 46 so that the latter cannot move through the slot 122.

Energization and deenergization of the wiper motor 79 is adapted to be controlled by a manually manipulatable electric switch (not shown). The switch is in an operative electric circuit means (not shown) with the wiper motor 79. The electric circuit means also includes a park switch 125 in a parallel circuit with the manual on-off switch. The park switch 125 is carried by the guide track 30 and is spring biased toward a closed position. The solenoid coil 117 is in series with the park switch 125. When the manual switch is in an on position only the electric motor 79 is energized. When the manual switch is returned to its off position, the solenoid coil 117 is energized and electric motor 79 remains energized, since the park switch is in its closed position, to maintain the wiper apparatus in operation until the wipers reach their parked position P whereupon the park switch 125 is opened to deenergize the parallel circuit containing the coil 117 and the wiper motor 79.

During running operation, the solenoid coil 117 is deenergized and hence the auxiliary guide track is spring biased by the spring 111 to the position shown in FIG. 2. When termination of wiper operation is desired, the operator will move the electric switch (not shown) to its off position. When in its off position, the solenoid coil 117 is energized and the wiper motor 79 remains energized due to the provision of the park switch 125, which is now closed. Energization of the coil 117 causes the core 118 thereof to pivot the link 110 and hence the auxiliary guide track from its first position, as shown in FIG. 2, towards its second position, as shown in FIG. 6, in which the leg 101 thereof is disposed within the path of movement of the trolley 32. As the trolley 32 approaches its rightmost end position the wheel 46 thereof engages the leg member 101 which causes the trolley to be moved up the inclined leg member 101. This causes the trolley 32 and hence the wiper 26 to be pivoted about the axis of roller 45 from a generally vertical run position towards its park position. The wiper 25 is also caused to be pivoted an equal amount due to the parallel linkage arrangement 33. As the trolley 32 is moved further to the right the wheel 45 which is drivingly connected to the drive means 35 engages the leg member 101. When this occurs the force imparted to the wheel 45 by the drive means 35 causes the auxiliary guide track 100 to be further pivoted in a counter clockwise direction until it is in its third position, as shown in FIG. 7. During this pivotal movement the core 118 of the energized solenoid is moved in opposition to the compression spring 120. When the auxiliary guide track 110 has been moved to its third position, as shown in FIG. 7, the trolley 32 will be vertically disposed and hence, the wiper 26 will be disposed in a generally horizontal park position. The wiper 25 will also be disposed in a generally horizontal park position due to the parallel linkage arrangement 35, since the arm 65 thereof will have been moved in the counterclockwise direction 90°, which in turn causes the pivotally mounted arm 64 and wiper 25 to be moved in a counterclockwise direction. When the auxiliary guide track 100 is in the third position, the leg 101 thereof engages the park switch 125 to open the same. This causes the solenoid 115 and the wiper motor 79 to be deenergized.

When wiper operation is initiated, the reverse movement of the various parts takes place. When wiper operation is initiated the solenoid coil springs is deenergized and the belt 77 is caused to be moved in the direction of the arrow 90. This movement causes the roller 45 to be moved toward the left which in turn causes the entire trolley 32 to be moved from its generally vertical position towards its horizontal position in the main guide track 30. This reverse movement is aided by the spring 111 and 120 which tend to pivot the auxiliary guide track 100 towards its second position, as shown in FIG. 6, and thereafter the auxiliary guide track 100 is caused to move to its first position, as shown in FIGS. 2 and 4, by the spring 111. When in this position the trolley 32 will be guided for movement through its first path and hence the wipers 25 and 26 will be moved transversely of the windshield 10 while being maintained in a generally vertical run position.

Although the illustrated embodiment hereof has been described in great detail, it should be apparent that certain modifications, changes, and adaptations may be made in the illustrated embodiment, and that it is intended to cover all such modifications, changes and adaptations which come within the spirit of the present invention.

What is claimed is:

1. A windshield wiping apparatus for wiping a windshield of an automotive vehicle comprising: a windshield wiper; and an actuating mechanism operatively connected with the wiper for reciprocating the latter transversely of the windshield while maintaining the wiper in a generally vertical disposition between first and second positions during running operation and for moving the wiper between a generally horizontal park position adjacent an edge of the windshield and its generally vertical run position when operation is initiated and terminated; said actuating mechanism including a generally horizontally extending main guide means, a trolley supported and guided for movement in opposite directions through a first generally horizontal path by said guide means, said wiper being operatively connected with said trolley and being in a generally vertical disposition when said trolley is moved through said first path, a drive means operatively connected with said trolley for reciprocating the latter through said first path and thereby said wiper transversely of said window between its first and second positions, and a parking means for moving said wiper between its parked position and its generally vertical run position when operation is initiated and terminated, said parking means comprising an auxiliary guide means for guiding said trolley for movement through a second path transversely of said first path to cause said wiper to be moved from its generally vertical run position toward its generally horizontal park position, said auxiliary guide means including selectively movable member which is moved into said first path to effect movement of said trolley through its second path when running operation is being terminated.

2. A windshield wiping apparatus for wiping a windshield of an automotive vehicle comprising: a windshield wiper; and an actuating mechanism operatively connected with the wiper for reciprocating the latter transversely of the windshield while maintaining the wiper in a generally vertical disposition between first and second positions during running operation and for moving the wiper between a generally horizontal park position and its generally vertical run position when operation is initiated and terminated; said actuating mechanism including a generally horizontally extending main guide track, a trolley supported and guided for movement in opposite directions through a first path by said guide track, said wiper being connected to said trolley, a drive means operatively connected with said trolley for reciprocating the latter through said first path and thereby said wiper transversely of said window between its first and second positions, and a parking means for moving said wiper between its parked position and its generally vertical run position when operation is initiated and terminated, said parking means comprising an auxiliary guide track for guiding said trolley for movement through a second path to cause said wiper to be moved from its generally vertical position toward its parked position, said auxiliary guide track being pivotally supported by said main guide track for movement between a first position in which it permits said trolley to move through its first path and a second position in which it is disposed within said first path of movement to effect movement of said trolley through its second path, and means connected with said auxiliary guide track for selectively moving the same between its first and second positions.

3. A window wiping apparatus as defined in claim 2 wherein said trolley includes first and second spaced rollers and wherein said drive means is pivotally connected to said first roller.

4. A window wiping apparatus as defined in claim 3 wherein said auxiliary guide track is generally U-shaped and wherein one leg of the U-shaped auxiliary guide track forms part of the main guide track when in its first position.

5. A window wiping apparatus as defined in claim 4 wherein said one leg of said U-shaped auxiliary guide track is disposed at an acute angle with respect to said main guide track when moved to its second position and wherein said second roller of said trolley moves along said one leg until said first roller engages said one leg whereupon further movement of said first roller causes said auxiliary guide track to further pivot about said pivot means until it is disposed substantially normal to said first guide track.

6. In an automotive vehicle having a windshield supported by body structure of the vehicle, a windshield wiping apparatus carried by said body structure for wiping the windshield of the vehicle, said windshield wiping apparatus comprising: a pair of windshield wipers, and an actuating mechanism operatively connected with said windshield wipers for reciprocating the latter transversely of the windshield windshield while maintaining said wipers in a generally vertical disposition between first and second positions during running operation and for moving the wipers between their generally vertical run position and a generally horizontal park position when operation of the apparatus is initiated and terminated; said actuating mechanism including a generally horizontally extending main guide track supported by the body structure, first and second spaced trolleys supported and guided for movement in opposite directions through a first path by said main guide track, said trolleys each comprising first and second spaced rollers and a member having its opposite ends pivotally connected with the rollers, one of said wipers being pivotally connected to said member of said first trolley and the other of said wiper being nonrotatably connected to said member of said second trolley, a first link connected at its opposite ends to said first and second trolleys, a first arm pivotally connected with said first trolley and nonrotatably connected with said one wiper, a second arm nonrotatably connected with said second trolley, a second link having its opposite ends pivotally connected to said first and second arms, a drive means operatively connected with said second trolley for reciprocating the latter through said first path and thereby said wipers transversely of said windshield between the first and second positions, said drive means including a drive link having one end pivotally connected to the first roller of said second trolley, and a parking means for moving said wipers between their parked position and their generally run positions when operation is initiated and terminated, said parking means comprising an auxiliary guide track for guiding said second trolley for movement through its second path to cause said wipers to be moved from their generally vertical run position toward their park position, said auxiliary guide track being generally U-shaped and with one leg of the U-shaped auxiliary guide track being pivotally connected via a pivot means to said main guide track, said auxiliary guide track being movable between a first position in which said one leg forms part of the main guide track to aid in guiding the second trolley through its first path of movement, a second position wherein said one leg of said U-shaped auxiliary guide track is disposed at an acute angle with respect to the main guide track and a third position in which said one leg of said U-shaped guide track extends normal to said main guide track, and selectively operable means for maintaining said U-shaped guide track in its first position during running operation and for moving said U-shaped guide track to its second position when running operation is being terminated, said auxiliary guide track when in its second position causing the second roller of said trolley to move along said one leg until said first roller thereof engages said leg whereupon further movement of said first roller causes said auxiliary guide track to further pivot towards its third position whereby said wipers are caused to be moved toward their parked position.

* * * * *

FO-1050
(5/69)

UNITED STATES PATENT OFFICE
CERTIFICATE OF CORRECTION

Patent No. __3,649,989__  Dated __March 21, 1972__

Inventor(s) __Eric G. Parker__

It is certified that error appears in the above-identified patent and that said Letters Patent are hereby corrected as shown below:

Column 1, line 26 "windhsield" should read --windshield--; line 52 delete ",". Column 2, line 10 "arrangements" should read --arrangement--. Column 5, line 44 "springs" should read --117--. Column 6, line 75 delete "windshield".

Signed and sealed this 14th day of November 1972.

(SEAL)
Attest:

EDWARD M. FLETCHER, JR.
Attesting Officer

ROBERT GOTTSCHALK
Commissioner of Patents